United States Patent [19]

Mascitelli et al.

[11] Patent Number: 4,919,558
[45] Date of Patent: Apr. 24, 1990

[54] PIPE CLEANING HEAD ADAPTER

[76] Inventors: Edmund J. Mascitelli, 601 SE. 23 Ave., Pompano Beach, Fla. 33062; Douglas J. Riggs, 1731 Mistletoe, Sebastain, Fla. 32958

[21] Appl. No.: 293,016

[22] Filed: Jan. 3, 1989

[51] Int. Cl.$^5$ ............................................. B25G 3/00
[52] U.S. Cl. ..................................... 403/9; 403/182; 403/287; 403/381; 15/104.33
[58] Field of Search ................. 403/331, 381, 9, 182, 403/287, 286; 15/104.33; 24/578

[56] References Cited

U.S. PATENT DOCUMENTS

| | | | |
|---|---|---|---|
| 2,755,115 | 7/1956 | Kollmann | 403/9 |
| 2,892,649 | 6/1959 | Kollmann | 403/182 |
| 3,118,159 | 1/1964 | Kollmann | 15/104.33 |

Primary Examiner—Andrew V. Kundrat
Attorney, Agent, or Firm—Richard C. Litman

[57] ABSTRACT

The present invention is a reducing coupling adapter, specifically for using known ⅝" sewer cleaning heads with the conventional ⅞" sewer cleaning cable and machine. The present invention simply snaps onto one end of a ⅞" cable at the front of the cable, thereby allowing the smaller ⅝" heads to be used in the sewer cleaning process.

2 Claims, 1 Drawing Sheet

PIPE CLEANING HEAD ADAPTER

BACKGROUND OF THE INVENTION

The main method of cleaning main line stoppages in the sewer system of a house is to send a "snake" comprising a cable with a cleaning head on the end from the vent terminus at roof level. The plumber sets his source machine up using conventional cable and $\frac{7}{8}''$ heads and runs the cable through his machine, down the stack to the obstruction which may be grease, hair, etc. Problems arise, however, when the stack size at the roof has been reduced in pipe size to a size too small for the conventional $\frac{7}{8}''$ cleaning heads. This is a common construction practice today, and in older homes in the southern states especially, where kitchen sink stacks were always reduced to $1\frac{1}{2}''$ diameter at roof level but are 2" below floor level. The plumber must use a cleaning head to scour the inside of the pipe to effectively clean the grease, etc., but the size of the stack limits the size of the cleaning head, thus limiting the quality of the plumber's work, possibly resulting in frequent return visits.

Presently, the plumber has a few costly alternatives for entering this stack. He must use a smaller cleaning-/cutting head that is adaptable to a conventional cable. The other alternative is to resort to the next size smaller cable, $\frac{5}{8}$, for the smaller cable machine. There are two ways to do this: one is to buy the whole new, smaller machine, cable and heads just for this purpose, at a considerable expense. The other is to buy the adapter, which is a sleeve to insert into the larger machine, allowing it to accept the smaller cable and heads. This is also very costly, as one must buy the adapter, the $\frac{5}{8}''$ cable, and the heads. This is also inefficient, as this machine is made for $\frac{7}{8}''$ cable pushing smaller size cable, which is subject to kinking under stresses encountered in the main line stoppages, especially as the length of cable increases. The plumber must also carry around an extra machine and cable (at least 75 feet) in his truck, which normally already has enough equipment and tools inside.

SUMMARY OF THE INVENTION

The present invention does away with all of these costly alternatives and does it better, with less bulky equipment to handle, less parts, and for much less cost. The present invention thus is an adapter for the cable itself, allowing the $\frac{7}{8}''$ cable to accept the $\frac{5}{8}''$ heads via one simple reducing coupling that snaps on one end of the $\frac{7}{8}''$ cable, and having a $\frac{5}{8}''$ end for the heads. Its small size (approximately 2") allows it to fit in a toolbox and is all a plumber needs to accomplish this task in all the alternatives mentioned here previously. Its heavy-duty steel (or non-ferrous alloy) construction lends itself to everlasting usage and endurance.

Accordingly, one object of the present invention is a device that allows a plumber to effectively clean through small diameter vent pipes using a powerful machine and cable which could not be used without the present invention.

Another object of this invention is the small, compact size of the tool, as compared to the alternative methods of adapting now available.

Another object of this invention is the reduction of cost compared to the other means of adapting to different size cables.

Another object of this invention is the simplicity and high strength of the device.

These and other objects of the present invention will become readily apparent upon further review of the following specification and drawings.

BRIEF DESCRIPTION OF THE DRAWINGS

Similar reference characters denote corresponding features throughout the drawings.

DETAILED DESCRIPTION OF THE PREFERRED EMBODIMENT

Figure 1:
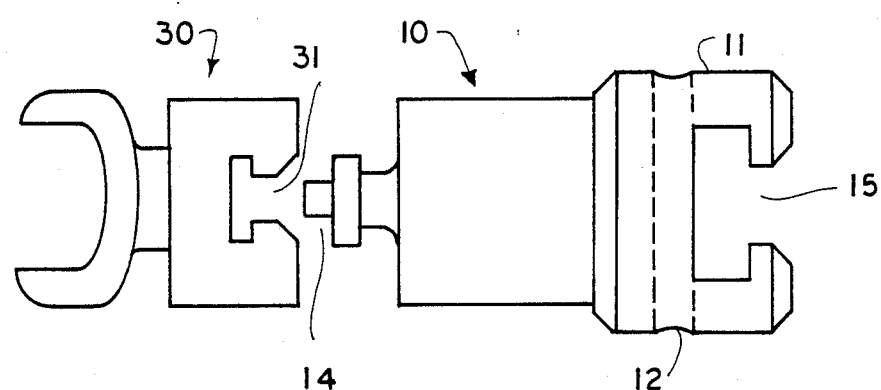
FIG. 1 is a side view of the invention showing the adapter and heads.
Figures 2A, 2B, 2C:
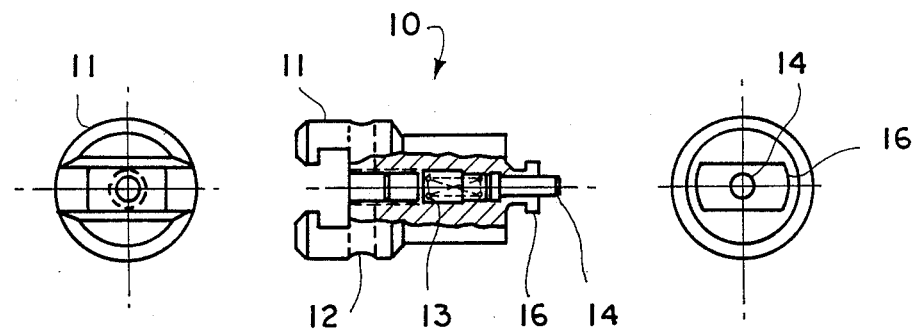
FIG. 2a shows a bottom view of the invention.
FIG. 2b is a side view in partial cross-section showing the inner details of the invention.
FIG. 2c shows a top view of the invention.
Figure 3:
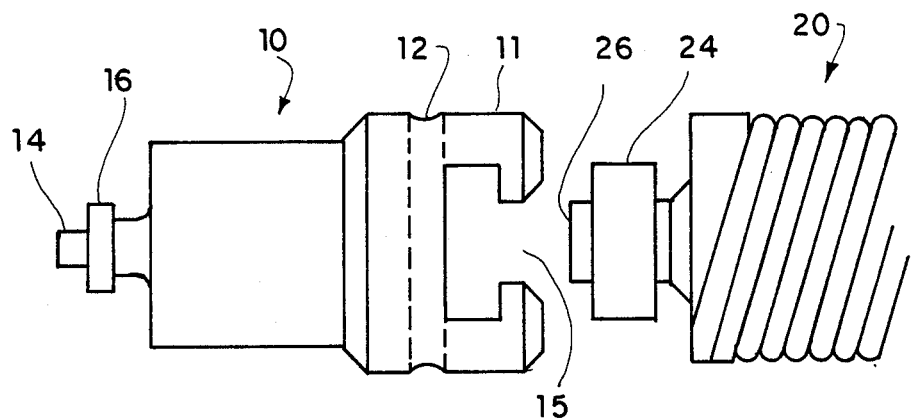
FIG. 3 shows a side view of the adapter and the large cable.

Referring now to the drawing shown in FIG. 2a, female end 11, or "T" slot, of the adapter 10 joins to a male connector end 24 of the $\frac{7}{8}''$ cable 20, as in FIG. 3. Spring 13, shown best in FIG. 2b, which works in conjunction with a retaining pin 14, which is the means of connecting the cleaning head to this invention 10, as in FIG. 1. The retaining pin seat 15, works in conjunction with the retaining pin 26 of the male end of the $\frac{7}{8}''$ cable 20, as in FIG. 3. A hole 12 bored through the device 10 allows for an object to be inserted, depressing the retaining pin 26, to remove the device 10 from the cable 30. "T" bar 16, shown in FIG. 2c, provides strength and stability against shear forces. To use device 10, the cleaning head 30 is inserted over the "T" bar 16, as in FIG. 1, while depressing the retaining pin 14. The retaining pin 14 at this point is pressing against the spring 13 on its bottom side. When the cleaning head 30 is in the correct position, the retaining pin 14 lines up with a seat 31 in the cleaning head 30. Once the pressure is released from the retaining pin 14, the spring 13 will push the pin 14 into the seat 31 in the cleaning head 30, locking it in place. Retaining pin 14 is the only means by which the heads 30 are secured to, or removed from the adapter 10, while the "T" bar 16 prevents the head 30 from shearing off.

On the back side of the adapter 10 is the "T" slot 11, or the female end, which lines up with the "T" bar 24 of the $\frac{7}{8}''$ cable end 20 as in FIG. 3. This end is inserted into the female slot 11 of the adapter 10 until the retaining pin 26 of the $\frac{7}{8}''$ cable 20 reaches the retaining pin seat 15 and locks into place. Removal is accompanied by inserting a metal instrument, such as a nail, through hole 12 which, when pushed through the hole 12, pushes down on the retaining pin 26 enough to disengage the device 10, allowing it to slide off. Removal of the cleaning head 30 is accomplished in the same manner, through a hole which exists in every cleaning head, which allows the straight metal instrument to pass through, pushing down the retaining pin 14, allowing the head 30 to be removed.

While we have illustrated and described the preferred form of construction for carrying the present invention into effect, this is capable of variation and modification without departing from the spirit of the invention. It is therefore to be understood that the invention is not limited to the precise details of construction as set forth, but other modifications as will be apparent to practitioners in the art may be resorted to within the scope of the appended claims.

We claim:

1. An adapter for connecting a pipe cleaning cable to a cleaning head of differing size including:
    a generally tubular member having an cable retaining end and an opposite cleaning head retaining end;
    said cleaning head retaining end having a spring loaded axially aligned retaining pin that mates with a corresponding passage in said cleaning head;
    said retaining pin being rigidly surrounded by a T-shaped retainer bar, said T-shaped retainer bar mating with a corresponding slot on said cleaning head; and
    said cable retaining end is wider than said cleaning head retaining end and has an open-ended slot that runs normal to the axis of said tubular member, said open-ended slot accepting in a mating fashion a T-shaped bar on the end of said cleaning cable, said cable retaining end having an axially aligned depression disposed on the surface of said open-ended slot to accept in mating fashion a retaining pin on said cleaning cable.

2. The adapter according to claim 1, wherein:
    said spring loaded retaining pin has a compression spring mounted inside a cavity in said tubular member adjacent and abutting said pin, distal said T-shaped retainer bar.

* * * * *